United States Patent [19]

Hager

[11] 3,995,658
[45] Dec. 7, 1976

[54] NON-RETURN VALVE
[75] Inventor: Daniel Hager, Chalon sur Saone, France
[73] Assignee: Societe des Clapets T.J., Socla, Chalon sur Saone, France
[22] Filed: June 12, 1974
[21] Appl. No.: 478,487
[52] U.S. Cl. ............................................ 137/543
[51] Int. Cl.² ..................................... F16K 15/06
[58] Field of Search ............ 137/542, 543, 543.13, 137/540, 536, 454.5, 543.19, 533.19, 533.21

[56] References Cited
UNITED STATES PATENTS

| 666,245 | 1/1901 | Ginaca | 137/543 |
| 784,534 | 3/1905 | Bassett | 137/543 |
| 1,890,223 | 12/1932 | Kilzer | 137/543 X |
| 2,102,289 | 12/1937 | Smolensky | 137/536 |
| 2,870,784 | 1/1959 | Walls | 137/543 |
| 3,272,219 | 9/1966 | Frantz | 137/543.19 X |
| 3,664,371 | 5/1972 | Schneider | 137/543.19 X |
| 3,688,794 | 9/1972 | Bird et al. | 137/542 X |

Primary Examiner—William R. Cline
Attorney, Agent, or Firm—Sughrue, Rothwell, Mion, Zinn & Macpeak

[57] ABSTRACT

A valve is provided for operation within a substantially cylindrical conduit section having an internal threaded portion adjacent a radially inwardly extending shoulder. A cylindrical apertured valve guide having external threads adjacent one end and an internal circumferential groove adjacent the same end is disposed in threaded engagement with the internal threaded portion of the conduit with the end of the guide abutting said shoulder. An annular sealing gasket is disposed on said shoulder within said groove to provide a valve seat for a spherical shaped valve member which is provided with a cylindrical side portion which is slidable within said cylindrical guide. The valve member also has an axially extending stem extending through an aperture in the opposite end of said valve guide and a spring surrounds said stem to bias the valve member into engagement with the seat.

1 Claim, 7 Drawing Figures

NON-RETURN VALVE

The invention relates to a non-return valve of a new kind.

This type of valve is used, for instance, as a safety valve. When disposed on a hydraulic line, it is adapted to close as soon as the pump supplying said line stops delivering. In this way, the line does not empty itself and the pump remains primed.

It is known that this type of valve is constituted by a shutter which comes to rest against a seat. The fluid-tightness should be complete when the shutter is resting against its seat and the shape of the shutter should allow the fluid to flow properly without any undue loss of head.

The object of the invention is to provide a valve which has such characteristics and is besides simple and unexpensive to produce.

A non-return valve according to the invention, including a shutter which rests against a seat, is characterized in that the shutter comprises a first half-shell, the side wall of which is cylindrical, said first half-shell being guided by a second half-shell which is extended by a cylinder of revolution having the same axis as the first half-shell, the latter sliding in said cylinder the end of which is provided with a thread on its outer side surface, while the assembly is disposed within a one-piece bowl which defines a bore in the shape of a cylinder of revolution having the same axis as the two half-shells, one of the ends of said bore being provided with a thread to which a shoulder is closely adjacent, the setting up being achieved by introducing into said bore that cylinder which extends the second half-shell, and screwing the end of said cylinder on the thread provided on the bore till said end abuts against the shoulder, means being provided, besides, for applying the first half-shell, which acts as a shutter, against the shoulder, the latter acting as a seat, for connecting the two parts of the bore of the bowl which are defined by said shoulder, for ensuring the fluid-tightness between the shoulder and the shutter when the latter is in its closed position.

According to a further feature of the invention, the means provided for ensuring the fluid-tightness between the shutter and the seat of the latter are constituted by a groove provided on the end of the inner side wall of the cylinder of the second half-shell, said groove receiving a sealing gasket, preferably an annulus-shaped one, which bears, besides, against the shoulder of the bowl.

According to a further feature of the invention, the means provided for applying the shutter against its seat and guiding it are constituted by:

a short rod having the same axis as the cylindrical wall of the first half-shell, and secured at the centre of the latter, a bore drilled in the centre of the second half-shell, said bore having the same axis as the latter, and receiving said short rod, a compression spring disposed about said short rod and bearing against the bottoms of the two half-shells, said spring pushing the first half-shell against the sealing gasket.

According to a further feature of the invention, the means which allow fluid communication between the two parts of the bore of the bowl when the shutter is away from its seat, are constituted by ports drilled through the wall of that cylinder which prolonges the second half-shell, said ports opening on to the outer surface of said cylinder, right above the thread provided on said surface, and being defined by generatrices of said cylinder, the first half-shell or shutter being introduced in said latter cylinder in a manner such that its convex surface bears against the seat, this general arrangement being adapted to reduce to a minimum the fluid loss of head brought about by the valve.

According to a further feature of the invention, the bore of the one-piece bowl into which the shutter is introduced has a greater cross-section in the area thereof which surrounds the second half-shell, while the transition portions between the sections are rounded in order further to limit the loss of head brought about by the valve.

According to a further feature of the invention, each end of the bore of the bowl is provided with means enabling the end of a conduit to be secured in continuation of said bore.

According to a modification of the invention, a bore perpendicular to the axis of the bowl opens into each of the two parts defined by the seat of the shutter, while each end of the bore of the bowl which contains the shutter is closed by a removable cap, the upstream cap enabling the fluid-tightness to be checked, while the downstream cap allows draining the circuit.

The accompanying drawing, which is given by way of non-limiting example, will enable the features of the invention to be better understood.

Figure 1:
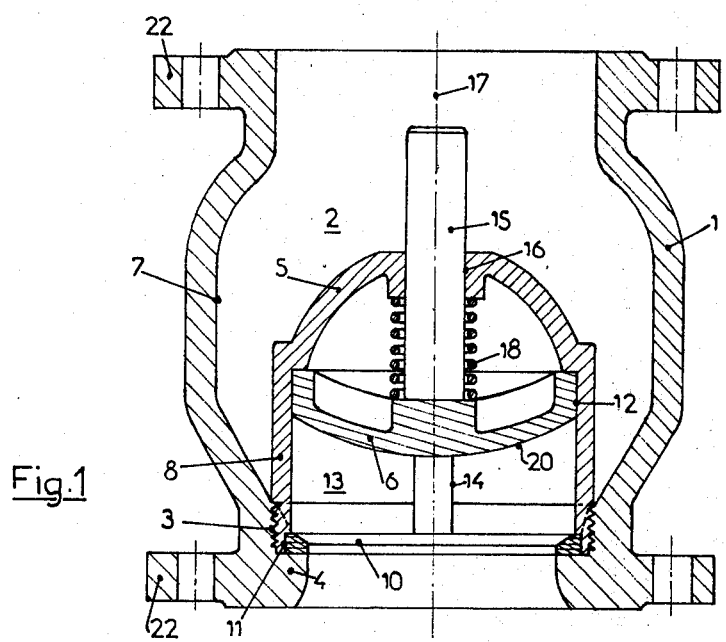
FIG. 1 is an axial sectional view of a non-return valve according to the invention, with its shutter open.
Figure 2:
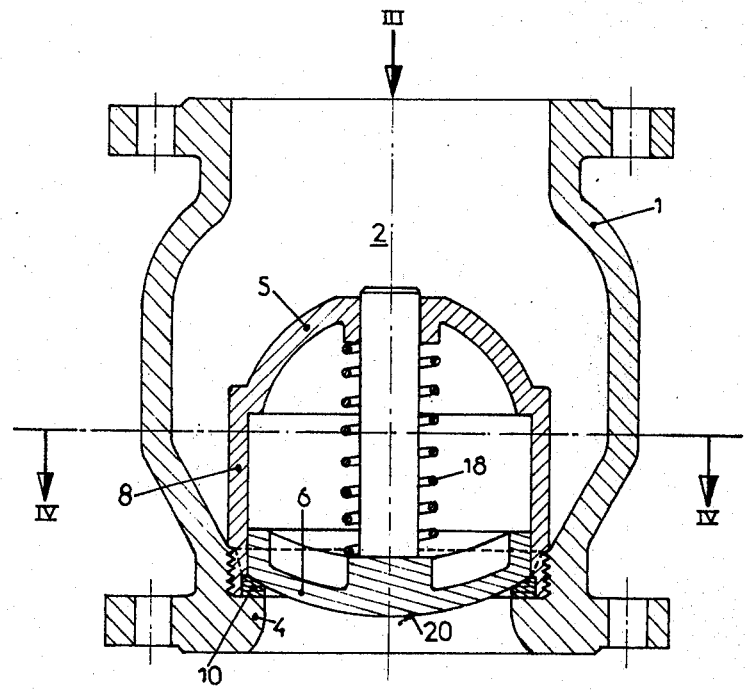
FIG. 2 is an axial sectional view of said valve at the time its shutter is closed.
Figure 3:
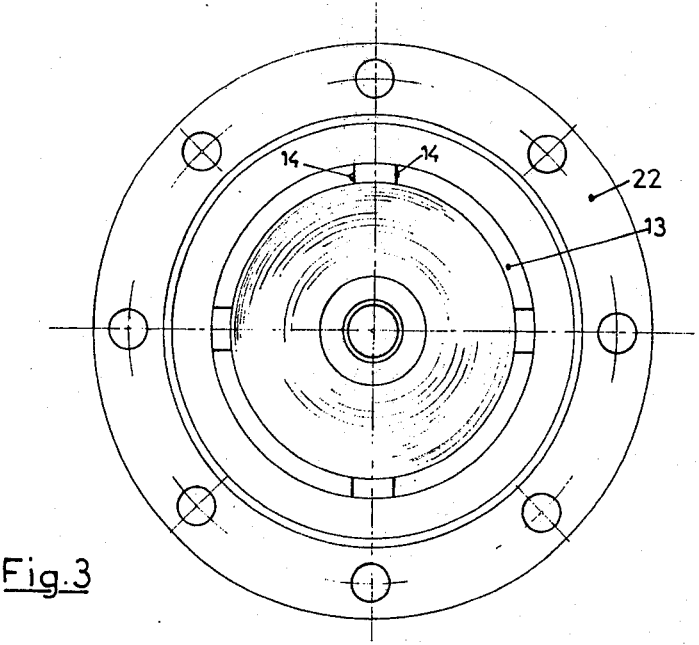
FIG. 3 is a top plan view of said valve.
Figure 4:
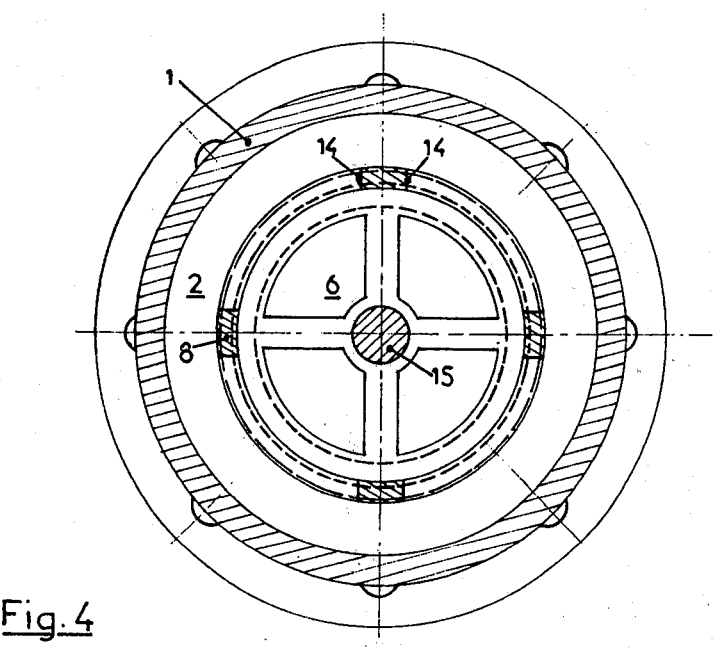
FIG. 4 is a sectional view along line IV—IV of FIG. 2.

There is shown in FIG. 1 a valve according to the invention. It comprises a bowl or substantially cylindrical conduit section 1 which defines a bore 2. One of the ends of said bore 2 is provided with an internal thread 3 to which an inwardly extending shoulder 4 is closely adjacent.

A valve guide cylinder 8 is provided with half-shell at one end 5, and has its opposite end screwed on the thread 3. The end of the inner side surface of said cylinder includes an annular groove 11 in which a sealing gasket 10 is housed. Said gasket 10 bears against the shoulder 4. Ports 13 are drilled through the wall of the cylinder 8, and open on to the outer side surface of said cylinder, right above the thread 3. Said ports are defined by generatrices 14 of the cylinder.

A valve member in the form of a curved half-shell 6 slides within said cylinder 8. The side wall 12 of said half-shell is cylindrical. A short rod 15 having the same axis 17 as the half-shell 6 is secured at the centre of the latter. Said rod is fitted in the bore 16 drilled in the centre of the half-shell 5 along the axis 17. A compression spring 18 is disposed about the short rod 15, and bears against the bottoms of the two half-shells 5 and 6.

The half-shell 6 is introduced in the cylinder 8 in a manner such that the convex surface 20 of said half-shell bears against the sealing gasket 10.

According to the embodiment shown in FIG. 1, four ports 13 are drilled through the wall of the cylinder 8. The area 7 of the bore 2 of the bowl 1 is provided with a cross-section greater than that of the cylinder 8. Each end of the bore 2 is provided with a ring 22, each of which allows securing the end of a line in prolongation of the bore 2.

Figure 5:
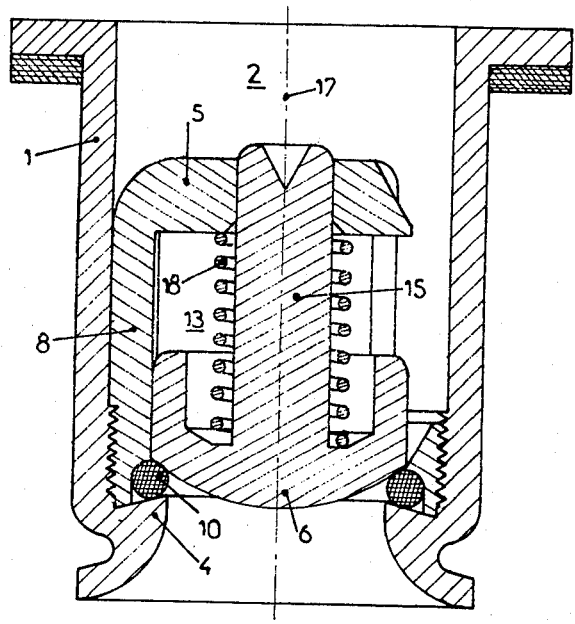
FIGS. 5 and 6 are views of a valve according to a first modified embodiment of the invention.
Figure 6:
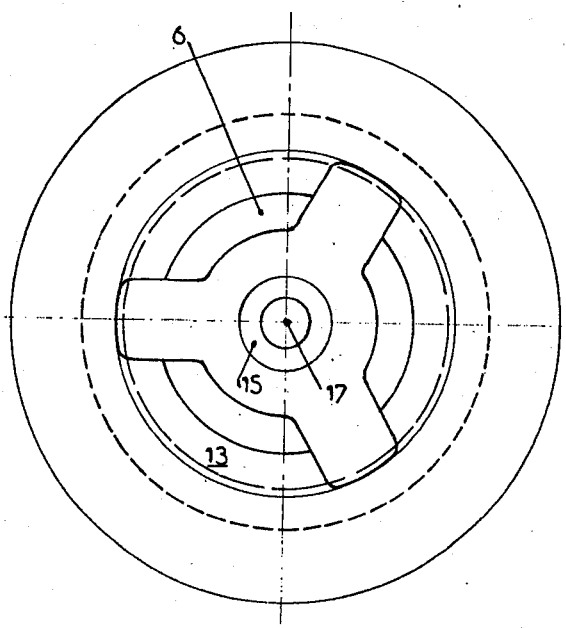

According to the modified embodiment illustrated in FIGS. 5 and 6, three ports 13 only are drilled through the side wall of the cylinder 8, and extend up to the vicinity of the axis 17. In this way, although the bore 2 has a constant cross section, there is a connection between the two parts of the bore 2 which are defined by the shoulder 4 when the half-shell 6 is away from the sealing gasket 10.

Figure 7:
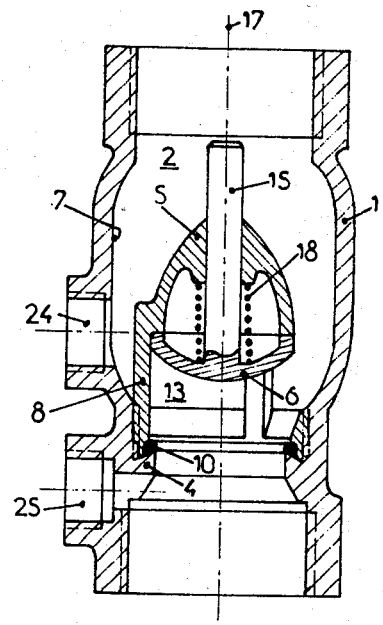
FIG. 7 is a view of a valve according to a second modified embodiment of the invention.

According to the third embodiment as illustrated in FIG. 7, three ports 13 are drilled through the wall of the cylinder 8. The bore 2 has a greater cross-section in its area 7. Two lines 24, 25, the axes of which are perpendicular to the axis 17, open into the bore 2, each one in one of the parts defined by the shoulder 4.

The operation is as follows:

The half-shell 6 acts as a shutter, while the shoulder 4 and the sealing gasket 10 act as a seat.

If a fluid under pressure is brought against the convex surface 20 of the half-shell 6, the latter is subjected to a force which tends to move it away from the gasket 10. As soon as said force exceeds the compressive stress provided by the spring 18, the half-shell 6 will move away from the gasket 10, and the fluid will be able to escape through the bore 2 into the discharge circuit.

The advantages of the invention are as follows:

the positioning of the sealing gasket 10 is easy and quick;

the general arrangement of the shutter inside the one-piece bowl 1 reduces to a minimum the losses of head brought about by the valve.

I claim:

1. A non-return valve comprising a substantially cylindrical one-piece conduit section having a radially inwardly extending shoulder and internal thread means adjacent said shoulder, a valve guide cylinder having a plurality of flow apertures disposed within said one-piece conduit section and having external thread means adjacent one end thereof in detachable engagement with the internal thread means on said section with said end bearing against said shoulder, the opposite end of said guide cylinder having means defining a central guide aperture, a valve member comprising a head portion having a cylindrical side wall adapted to slide within said guide cylinder and a convex curved half-shell portion adapted to seat against said shoulder and a rod portion secured to said head portion and extending through said aperture, spring means surrounding said rod portion of said valve member for normally biasing said curved half-shell portion into engagement with said shoulder, an internal groove formed in the end of said guide cylinder having said threaded means thereon and an annular sealing ring disposed in said groove in contact with said shoulder to provide sealing engagement between said valve member and said shoulder and between said cylinder and said shoulder.

* * * * *